United States Patent [19]

Leodolter

[11] 4,288,021
[45] Sep. 8, 1981

[54] TOOLING FOR SUPERPLASTIC FORMING DIFFUSION BONDING PROCESSES

[75] Inventor: Walter Leodolter, Rancho Palos Verdes, Calif.

[73] Assignee: McDonnell Douglas Corporation, Long Beach, Calif.

[21] Appl. No.: 81,483

[22] Filed: Oct. 3, 1979

[51] Int. Cl.³ .............................................. B23K 20/14
[52] U.S. Cl. ................................ 228/15.1; 29/421 R; 72/60
[58] Field of Search ................. 228/15.1, 265, 173 A; 29/421 R; 72/38, 60–63; 277/3, 27

[56] References Cited

U.S. PATENT DOCUMENTS

| | | | |
|---|---|---|---|
| 3,907,371 | 9/1975 | Luedi et al. | 29/421 R X |
| 3,934,441 | 1/1976 | Hamilton et al. | 72/60 |
| 4,087,037 | 5/1978 | Schier et al. | 228/15.1 X |
| 4,189,156 | 2/1980 | Geary, Jr. et al. | 277/3 X |

*Primary Examiner*—Paul A. Bell
*Assistant Examiner*—K. J. Ramsey
*Attorney, Agent, or Firm*—George W. Finch; Donald L. Royer; John P. Scholl

[57] ABSTRACT

Tooling for use in an autoclave or a hot press for the superplastic forming and diffusion bonding of metals which tooling includes upper and lower portions with a labyrinth seal therebetween having inert counterflowing gas introduced thereto to prevent contamination from flowing across the seal to attack the metal being processed.

12 Claims, 7 Drawing Figures

TOOLING FOR SUPERPLASTIC FORMING DIFFUSION BONDING PROCESSES

The Government of the United States of America has rights in this invention pursuant to Contract No. F33615-77-C-5110 awarded by the Department of the Air Force.

BACKGROUND OF THE INVENTION

It long has been known that certain metals and metallic alloys when heated to particular temperatures may be formed into cavities by relatively low gaseous pressures or diffusion bonded. For example, titanium alloys of 40% aluminum and 60% titanium when heated to a temperature of about 956° C. may be so processed. To avoid various problems associated with such forming, it is common to establish and maintain an inert gaseous atmosphere about the material being processed when it is at elevated temperatures, using an inert gas such as nitrogen, argon or the like.

In order to maintain the desired atmosphere about the hot metal components during the superplastic forming diffusion bonding operation, the entire forming apparatus necessarily must be enclosed in an envelope or container that is sealed to avoid contamination by outside gasses, such as air, oxygen, hydrogen, carbon dioxide and the like. However, due to the elevated tempertures required in the forming process, it is difficult to maintain seals. Organic seals have been tried but none has been found which can withstand the temperatures involved in the forming operation. Metallic seals, on the other hand, heretofore have not been able to provide an adequate seal because of warping of the adjacent surfaces against which the seals must operate. In some practical instances, the very size of the material to be formed and the ultimate product produced severely amplify this problem.

Heretofore, it has been the practice to create an envelope about the die mechanisms used in the forming process by welding or otherwise continuously connecting components or juxtapositioned peripheral edges of the envelope. This is an expensive and time consuming procedure and necessitates a cutting operation to remove the envelope from the balance of the hardware to gain access to the dies and the formed part after the process is complete.

Rotating machinery such as steam turbines commonly used counterflow labyrinth seals in a hot high pressure environment. However, these seals generally are of the loose contact type because of the necessity that the parts move with respect to each other during operation.

BRIEF DESCRIPTION OF THE PRESENT INVENTION

In accordance with the present invention, it has been found that the desired inert environment or inert gaseous atmosphere may be maintained about the material to be superplastically formed and diffusion bonded by the tool through the use of a seal with multiple metallic sealing component having a controlled gaseous leakage thereabout. The multiple metallic sealing components act as a labyrinth and permit the maintenance of the desired atmosphere within the tool while limiting loss of the relatively expensive inert forming gasses. The seal assures that the inert atmosphere about the part being formed is maintained by providing inert gas flow across the seal which counterflows against the relatively inexpensive but non-inert force providing gasses when the tool is used in an autoclave or atmospheric pressure when the tool used in a hot press. Thus, metals and metallic alloys may be superplastically formed with autoclaves as well as hot presses. This is particularly advantageous since as parts to be formed get larger and larger, press capacity limits are reached and it is undesirable to tie up a huge, expensive hot press for the time required for the superplastic forming or diffusion bonding processes. Also, problems associated with time consuming creation of welded envelopes are eliminated, the dies are readily accessible and an appropriate atmosphere can be maintained even though imperfect seals and tool component warping are encountered.

When an autoclave or pressure vessel is used to maintain the desired die pressure, such pressure is on the order of 200 PSIG. A furnace also may be enclosed within the autoclave to raise the temperature of the entire contents of the autoclave including the forming devices and the like to the desired superplastic forming and diffusion bonding temperatures. Conduits which pass through the sides of the autoclave are flexibly connected to the tool for the introduction of forming gasses, seal counterflow gasses, and environment maintaining gasses, as well as the venting of undesired gasses.

The seal is constructed through the use of rings of metallic tubing arranged in a concentric regularly spaced relationship as the sealing components between the forming die members. When three sealing rings are used, die force applying autoclave pressurizing gas leaks past the outermost sealing ring into a cavity between the outermost and middle sealing ring loosing most of its pressure in so doing. This cavity is controllably vented to atmosphere. The pressurizing gas, which generally is required in quantities, which make the use of inert gas too expensive, then leaks past the center sealing ring to a cavity between the center sealing ring and the inwardmost sealing ring at a still further reduced pressure. Inert gas is provided to a cavity on the inside of the innermost sealing ring which at a sufficient pressure so that it leaks past the innermost sealing ring toward the center sealing ring to assure that the pressurizing gas never passes the innermost sealing ring. The cavity between the center sealing ring and the innermost sealing ring is vented to atmosphere at a controllable rate to prevent pressure buildup. Since the inert gas required to counterflow the pressurizing gas at its greatly reduced pressure caused by the outermost and center sealing ring is relatively low, the cost of maintaining this seal is relatively low. Of course, means must be provided to preload the sealing rings prior to the introduction of pressurizing gas thereabout to assure that the initial gas flows are not excessive. Such seals are able to tolerate the inevitable warping, movement and mismatch of tooling used for diffusion bonding and superplastic forming, and therefore provide an economic solution to the sealing problems of such processes which has heretofore been unrealized.

It therefore is an object of the present invention to provide tooling which enables economic superplastic forming and diffusion bonding in a production situation.

Another object of the present invention is to provide tooling having seals which are able to protect materials being superplastically formed from undesirable effects of force producing active gasses or the atmosphere.

Another object is to provide a sealing method compatible with the high temperatures and pressures involved in a superplastic forming or diffusion bonding processes.

Another object is to conserve expensive inert gasses during superplastic forming processes.

Another object is to provide a superplastic forming diffusion bonding process which does not require enormous hot presses but instead can be performed inside autoclaves or other types of pressure vessels.

These and other objects and advantages of the present invention will become apparent to those skilled in the art after considering the following detailed specification in conjunction with the accompanying drawings wherein:

BRIEF DESCRIPTION OF THE DRAWINGS

FIG. 3 is a top view of the bottom portion of the tooling of FIG. 2;

DETAILED DESCRIPTION OF THE SHOWN EMBODIMENTS

Figure 1:
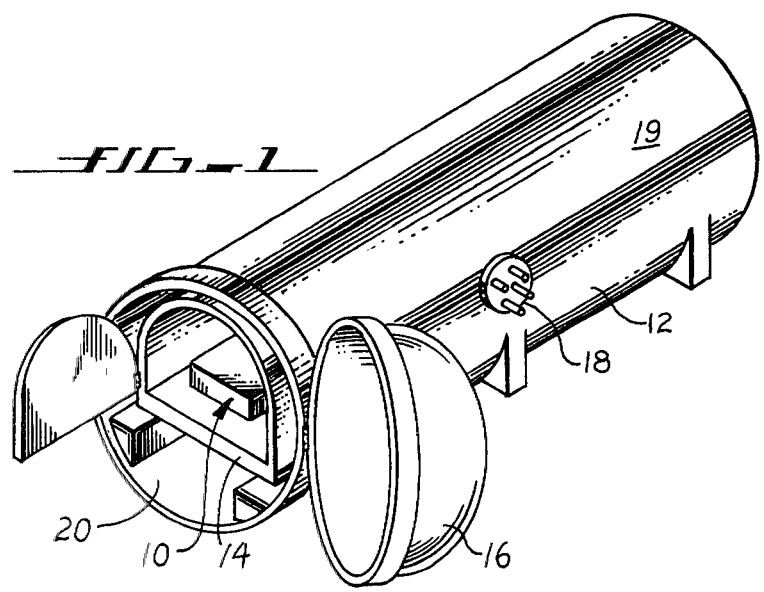
FIG. 1 is a perspective view of an autoclave having tooling therein constructed according to the present invention.

Referring to the drawings more particularly by reference numbers, number 10 in FIG. 1 refers to tooling constructed according to the present invention in position in an autoclave 12. Although the present invention 10 is shown hereinafter in incorporation with the autoclave 12. It is also adaptable for use in a hot press when such is desirable.

The autoclave 12 includes a furnace 14 for heating the tooling 10 and a doorway 16 used to close the autoclave 12 so that it is a sealed pressure vessel for the application of heat and pressure to the tooling 10. A multiple conduit feedthrough 18 shown diagrammatically is provided through the pressure vessel side 19 formed by the autoclave 12 to enable gasses to be introduced and removed from the interior 20 of the autoclave 12 and the tooling 10 from external sources.

Figure 2:
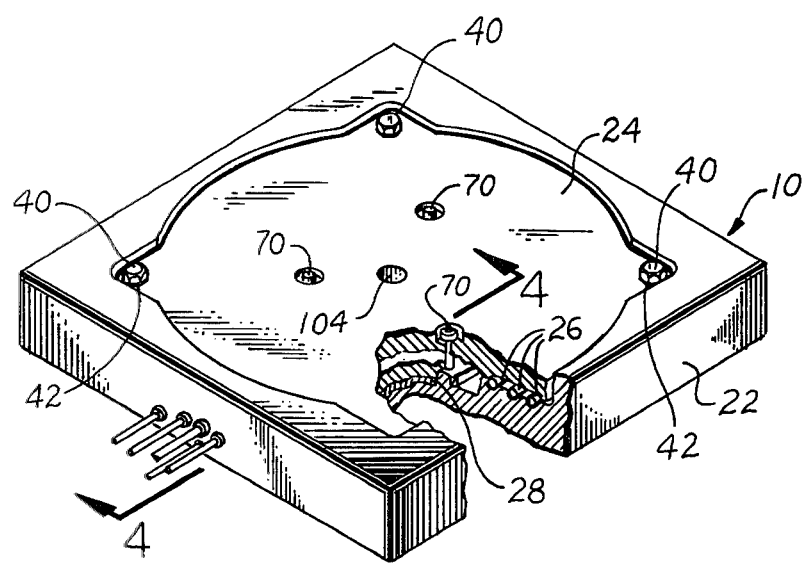
FIG. 2 is a perspective view of typical tooling constructed according to the present invention.

As shown in FIG. 2, the tooling 10 includes a lower die portion 22 and an upper die portion 24 between which a labyrinth seal 26 is provided. When the tooling 10 is placed in the autoclave 12 and the autoclave 12 is pressurized, it is uneconomic to use inert gas of such pressurization, carbon dioxide being the normal pressurizing gas. Since the tooling 10 is intended for a high temperature superplastic forming and diffusion bonding process, the carbon dioxide must be prevented from reaching the hot superplastically formable material 28 which normally is extremely sensitive to active gasses and degrades when in contact therewith. The seal 26 provides this function even though there typically is relatively large movement between the upper and lower die portions 24 and 22 as well as warpage and other inaccuracies therebetween caused by temperature and pressure variations.

As shown in FIG. 3, the seal 26 includes a plurality of sealing tubes, three tubes 32, 34 and 36 being shown, which are formed in rings and spaced concentric juxtapositioned to each other about the area 38 in which superplastic forming and diffusion bonding processes take place. As can be seen in FIG. 2, alignment bolts 40 are provided which extend through matching holes 42 in the upper die portion 24 the thread into holes 43 (FIG. 3) to assure proper relative positioning of the upper and lower die portions 24 and 22 in contact with the seal 26 and to preload the seal 26. The upper die portion 24 is free to slide down on the bolts 40 toward the lower die portion 22 as the seal 26 seats during the process to be described.

Figure 4:
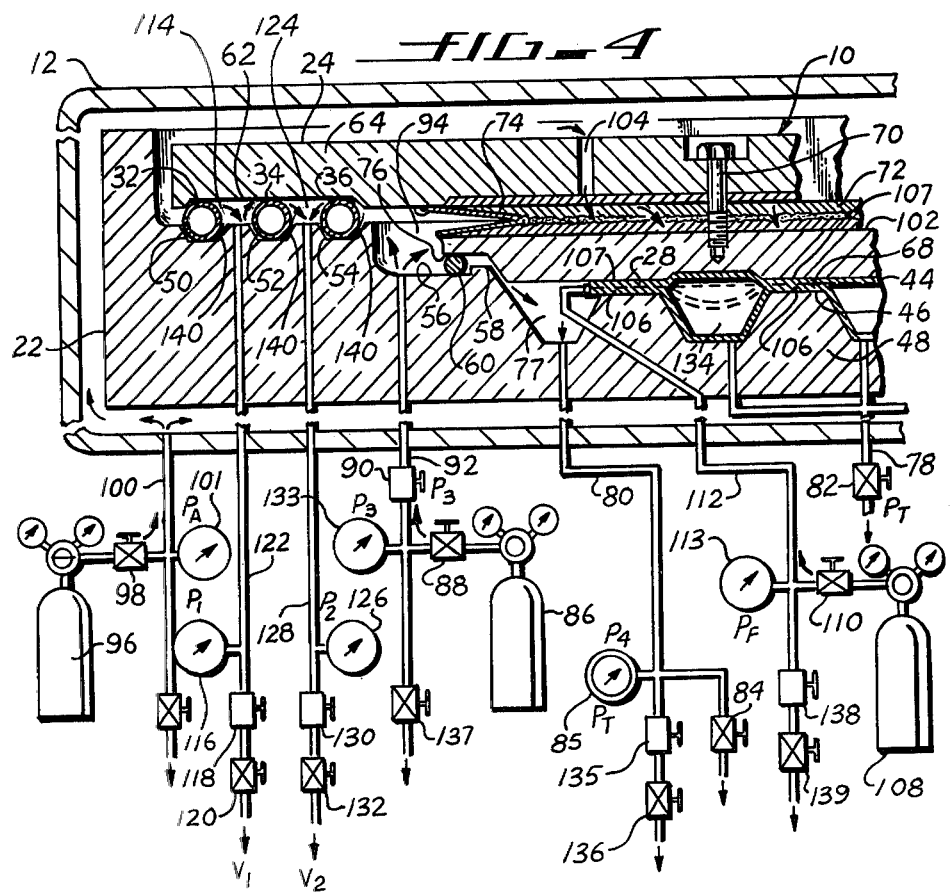
FIG. 4 is a cross-sectional view taken on line 4—4 of FIG. 2 having the gaseous pressure applying and venting apparatus diagrammatically included.

A typical superplastic forming and diffusion bonding process is shown taking place, FIG. 4, wherein the tooling 10 is shown diagrammatically placed within the autoclave 12 with the seal rings 32, 34 and 36 in their normal position between the lower and upper die portions 22 and 24. When such tooling 10 is to be used, suitable formable material shown as two sheets 44 and 46 are placed on the lower die area 48 of the lower die portion 22. The lower die portion 22 also includes concentric grooves 50, 52 and 54 in which new seal rings 32, 34 and 36 respectively are placed. The lower die portion 22 also includes an upwardly facing surface 56 with an adjacent radial flange 58 which is concentric to the grooves 50, 52 and 54. Typically, a solid titanium spacing ring 60 is placed on the surface 56 and is maintained in position by the flange 58.

Thereafter, the upper die portion 24 is placed on the lower die portion 22 so that a concentric groove 62 in the upper plate portion 64 thereof contacts and possibly imperfectly seals with the rings 32, 34 and 36. The upper die portion 24, in addition to the upper plate 64, includes a lower plate 66 on which the upper die area 68 is formed. The upper and lower plates 64 and 66 of the upper die portion 24 are connected together for relative movement by means of bolts 70 which are threadably connected to the lower plate 66 but can slide in a restricted fashion through a hole 73 in the upper plate 64. The area 72 between the upper and lower plates 64 and 66 is sealed by means of a flexible diaphragm 74 welded thereto. The bolts 70 and the diaphragm 74 enable relative movement between the upper and lower plates 64 and 66 needed for the forming process and to assure proper operation of the seal 26. The lower plate 66 includes an outwardly extending lip 76 which is positioned to bear downwardly against the titanium spacing ring 60.

Figure 5:
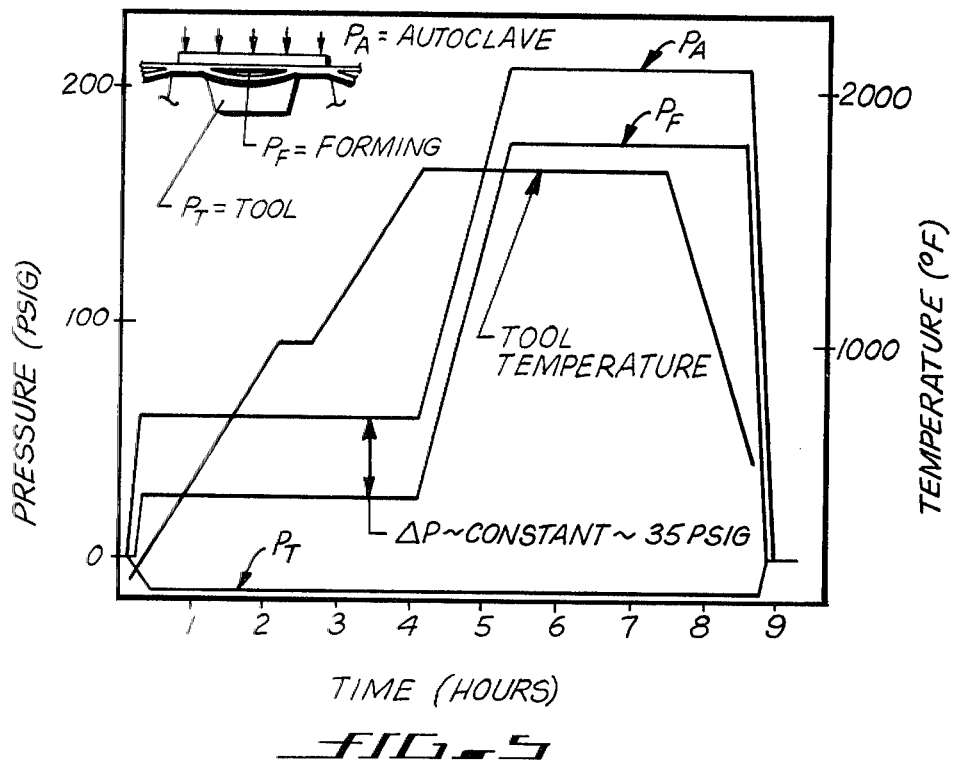
FIG. 5 is a graph of pressure and temperature versus time for a typical superplastic forming diffusion bonding process.
Figure 5:
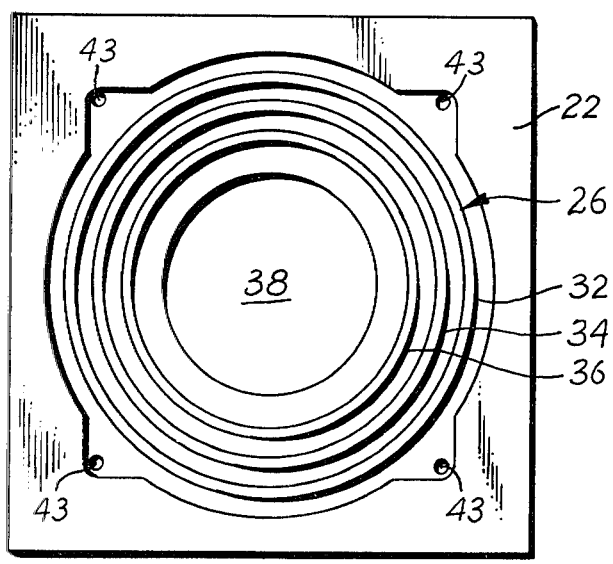

At the onset of a forming cycle, the area 77 between the upper and lower plates 64 and 66 is evacuated with subsequent argon gas purging through lines 78 and 80 which are connected to a source of vacuum, not shown, through shutoff valves 82 and 84 respectively. The vacuum or pressure in area 77 can be monitored by means of a gage 85 connected to the line 80. The purging argon gas is supplied from a cylinder 86 through a shutoff valve 88 and a flow control valve 90 to line 92 which is connected to a cavity 94 defined by the upper plate 64, the diaphragm 74, the lower plate 66. Pressure then is applied inside the autoclave 12 by means of a relatively economic gas such as carbon dioxide from a cylinder 96 through a shutoff valve 98 and a line 100 which empties into interior 20 of the autoclave 12. The pressure labeled $P_A$ is monitored by a gage 101 and is applied to the upper surface 102 of the lower plate 66 through a hole 104 in the upper plate 64 which causes selected portions 106 of the sheets 44 and 46 to be squeezed together between mating portions 107 of the die areas 48 and 68. As shown in FIG. 5, the pressure $P_A$ is raised to a predetermined level of about 60 PSIG. Forming gas pressure $P_F$ is introduced between the sheets 44 46 by means of an inert gas cylinder 108, a shutoff valve 110 and line 112 and monitored by a gage 113. As can be seen in FIG. 5, the forming gas pressure $P_F$ is kept relatively constant about 35 PSIG throughout the tool heatup period, an empirically developed value found adequate to separate the sheets 44 and 46 and commence the forming thereof. This procedure is used to consistently produce the most satisfactory bond and form separation without the use of anti-adherent or "stopoff" materials. During this period, the autoclave pressure $P_A$ is kept at about 60 PSIG just safely above the forming gas pressure to maintain the tool integrity, yet low enough to avoid frictional constraints of the different tool parts during the heat up phase. The pressure $P_A$ as aforesaid is maintained through the use of reactant gas such as carbon dioxide so it must be sealed away from the sheets 44 and 46. The gas in the area 20 leaks past the sealing ring 32 into cavity 114 since as aforesaid, the ring 32 cannot provide a perfect seal. The turbulence caused by the leakage reduces the pressure thereof of $P_A$ greatly, so that the pressure within the cavity 114 is greatly reduced. This reduced pressure is monitored by gage 116 and a flow control valve 118 and a shutoff valve 120 are used in the line 122 extending from the cavity 114 to vent the cavity 114 to the atmosphere. Therefore, a relatively low pressure zone is created in the cavity 114 between the sealing ring 32 and the sealing ring 34. The pressure in the cavity 124 between the rings 34 and 36 is monitored by means of a gage 126 connected to a line 128 extending to the cavity 124 which also includes a flow control valve 130 and a shutoff valve 132 and is vented to the atmosphere. The passage of gas past the ring 34 reduces the pressure even more so that pressure very near atmospheric pressure is present in the cavity 124. During this period inert gas is continually being introduced from the cylinder 86 into the cavity 94 which is held at a higher pressure than cavity 124 as monitored by gage 133. Therefore, inert gas tends to flow past ring 36 into the cavity 124 which is then vented as heretofore discussed. The sealing rings 32, 34 and 36 are resilient especially as the temperature increases so they are able to maintain relatively efficient seals even though they are subjected to various force pressure and temperature changes during a forming cycle. The net pressure difference between $P_A$ and the pressure in the cavities 94, 114, and 124 squeezes the rings 32, 34, and 36 so that the seal improves with increasing temperature. This is desirable since the process requires that the high temperature high pressure be held for a considerable length of time as shown in FIG. 5. The seal 26 therefore provides protection for the sheets 44 and 46 during the process from active gasses without the consumption of large quantities of inert and expensive gas.

The tooling 10 is then heated by the furnace 14 with a predictable lag at a rate of approximately 400° F. per hour limited only by the furnace performance rating. A temperature halt at approximately a 1000° F. allows for outgassing of the titanium when such is used. At the temperature of 700° F., the forming gas pressure $P_F$ is applied through line 112 at a rate determined analytically on the basis to operate at flow stresses corresponding to the maximum or near maximum "M"-values. For a given geometry it is justifiable to deviate from the optimum forming parameters which leads to the simple pressurization profile shown in FIG. 5. The linear pressure scheme is kept at a rate not to exceed 1500 PSI flow stresses in titanium. During this forming phase the autoclave pressure $P_A$ follows the same profile except approximately 25 PSIG higher. The forming analysis predicts that the forming of the bead 134 is completed during this pressurization phase or shortly thereafter. The pressure differential between $P_A$ and $P_F$ sizes the lower plate 66. This pressure situation is maintained for several hours to complete diffusion bonding of the sheets 44 and 46 at the portions 106 thereof. During this period the pressure rise in area 77 can be monitored by gage 85 and vented through flow control valve 135 and shutoff valve 136 which are also connected to line 80.

The rate of cooling and tool removal temperature is a critical variable because of its impact on a dimensional stability of the tool 10 and eventually the processed part. The pressures are maintained during the upper zones of the temperature drop for panel stability purposes. Once the tool temperature has reached about 500° F. all the pressures are released including the pressure in cavity 94 through shutoff valve 137 and the pressure in the bead 134 through flow control valve 138 and shutoff valve 139 connected to line 112. The tooling 10 then is removed from the autoclave, opened and the finished part remove.

Figure 6:
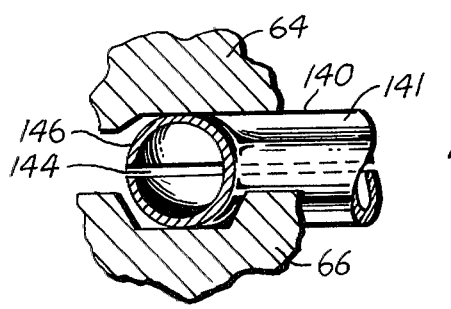
FIG. 6 is an enlarged cross-sectional view of a modified sealing ring suitable for use in the present invention.
Figure 7:
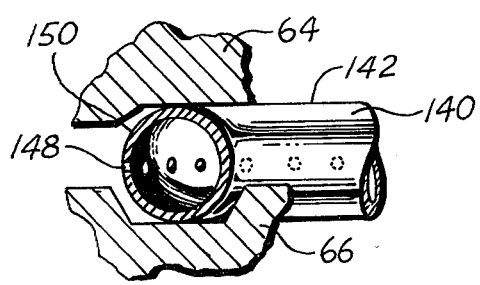
FIG. 7 is a view similar to FIG. 6 of a different modified sealing ring.

Preferably, the rings 32, 34 and 36 are constructed from mild steel and they may have an anti-galling coating such as nickel or silver applied to the outer surfaces 140 thereof. The rings 32, 34 and 36 can be closed tubular structures, or as shown in FIGS. 6 and 7, rings 141 and 142 having a modified configuration can be employed. The ring 141 includes a slot 144 in the pressure facing side 146 thereof, whereas ring 142 is shown with holes 148 through the pressure facing surface 150 thereof. The slot 144 and the holes 148 are utilized to introduce pressure within the rings 141 and 142 to better control the crushing thereof during use and form a more perfect seal during the process.

Thus there has been shown and described novel tooling for enabling superplastic forming and diffusion bonding which fulfills all of the objects and advantages sought therefore. Many changes, modifications, variations and other uses and applications of the subject invention will however become apparent to those skilled in the art after considering the foregoing specification together with the accompanying claims and drawings. All such changes, modifications, variations and other uses and applications which do not depart from the spirit and scope of the invention are deemed to be covered by the invention which is limited only by the claims which follow.

What is claimed is:

1. Tooling for use in superplastic forming diffusion bonding processes which includes:
    a first member having a first die surface thereon and a first seal engaging surface about said first die surface;
    a second member having a second die surface thereon and a second seal engaging surface about said second die surface, said first and second die surfaces facing each other and said first and second seal engaging surfaces facing each other;

a plurality of tubular sealing rings spaced from each other and positioned in contact with said first and second seal engaging surfaces, said first and second seal engaging surfaces and said plurality of sealing rings defining a plurality of cavities; and a plurality of conduits extending to the defined cavities for introducing and removing gas therefrom, said plurality of tubular sealing rings having a higher pressure side portion and a lower pressure side portion, said higher pressure side portion having at least one opening therethrough so that pressure can be introduced within said tubular sealing rings to expand them in response thereto.

2. The tooling defined in claim 1 wherein said plurality of concentric sealing rings includes an inner ring about said first and second die surfaces to define a first cavity, an middle ring about said inner ring to define a second cavity, and an outer ring about said middle ring to define a third cavity, and said plurality of conduits includes a first conduit extending to said first cavity, a second conduit extending to said second cavity, and a third conduit extending to said third cavity, said tooling further including:

first valve means in said first conduit to controllably introduce inert gas into said first cavity;

second valve means in said second conduit to controllably vent said second cavity; and third valve means in said third conduit to controllably vent said third cavity.

3. The tooling defined in claim 2 wherein said first conduit also includes fourth valve means to controllably vent said first cavity.

4. Tooling for use in superplastic forming diffusion bonding processes which includes:

a source of pressurized inert gas;

a first member having a first die surface thereon and a first seal engaging surface about said first die surface;

a second member having a second die surface thereon and a second seal engaging surface about said second die surface, said first and second die surfaces facing each other and said first and second seal engaging surfaces facing each other;

a plurality of sealing rings spaced from each other and positioned in contact with said first and second seal engaging surfaces, said first and second seal engaging surfaces and said plurality of sealing rings defining a plurality of cavities; and a plurality of conduits extending to the defined cavities for introducing and removing gas therefrom, said plurality of sealing rings including:

an inner ring about said first and second die surfaces to define a first cavity;

a middle ring about said inner ring to define a second cavity; and an outer ring about said middle ring to define a third cavity, and said plurality of conduits including:

a first conduit extending to said first cavity having first valve means therein to controllably introduce inert gas from said pressurized inert gas source into said first cavity;

a second conduit extending to said second cavity having second valve means therein to controllably vent said second cavity; and a third conduit extending to said third cavity having third valve means therein to controllably vent said third cavity, said first, second and third valve means being controllable so that inert gas flows from said first cavity to said second cavity across said inner ring, gas flows across said outer ring to said third cavity and gas flows across said middle ring from said third cavity to said second cavity.

5. The tooling defined in claim 4 wherein said first conduit also includes fourth valve means to controllably vent said first cavity.

6. The tooling defined in claim 4 including:

a source of pressurized force producing gas;

a container for force said producing gas on the opposite side of said third sealing ring from said third cavity; and fourth valve means connected between said source of pressurized force producing gas and said container to controllably pressurize said container.

7. Tooling for use in superplastic forming diffusion bonding processes which includes:

a first member having a first die surface thereon and a first seal engaging surface about said first die surface;

a second member having a second die surface thereon and a second seal engaging surface about said second die surface, said first and second die surfaces facing each other and said first and second seal engaging surfaces facing each other;

a plurality of concentric sealing rings spaced from each other and positioned in contact with said first and second seal engaging surfaces, said first and second seal engaging surfaces and said plurality of concentric sealing rings defining a plurality of cavities; and a plurality of conduits extending to the defined cavities for introducing and removing gas therefrom, said second member defining a plurality of threaded holes therein and said first member defining a plurality of holes therein in alignment with said threaded holes defined in said second member and generally at right angles to said first and second seal engaging surfaces, said tooling further including:

a plurality of fasteners which extend through said holes defined by said first member and which threadably engage said threaded holes defined by said second member, said plurality of fasteners preloading said concentric sealing rings by restricting movement of said first and second members away from each other while allowing movement of said first and second portions toward each other to accommodate crushing of said concentric sealing rings.

8. The tooling defined in claim 7 wherein said first member includes first and second portions and flexible sealing means connected therebetween, said first portion of said first member including said first seal engaging surface and said second portion of said first member including said first die surface.

9. The tooling defined in claim 7 wherein said second seal engaging surface includes a plurality of grooves positioned generally in a concentric arrangement, each of said grooves having one of said sealing rings positioned therein.

10. The tooling defined in claim 9 wherein said first seal engaging surface includes at least one groove therein, said at least one groove having at least one of said sealing rings positioned therein.

11. The tooling defined in claim 4 wherein said first member includes first and second portions and flexible sealing means connected therebetween, said first portion of said first member including said first seal engaging surface and said second portion of said first member including said first die surface.

12. The tooling defined in claim 11 wherein said second portion of said first member defines at least one threaded hole therein and said first portion of said first member defines at least one hole therein in alignment with said at least one threaded hole defined in said second portion and generally at right angles to said first and second seal engaging surfaces, said tooling further including at least one fastener which extends through said at least one hole defined by said first portion and threadably engages said at least one threaded hole defined by said second portion, said at least one fastener restricting movement of said first and second portions away from each other while allowing movement of said first and second portions toward each other to accomodate crushing of said sealing rings.

* * * * *